United States Patent
Muramatsu et al.

(10) Patent No.: US 7,506,738 B2
(45) Date of Patent: Mar. 24, 2009

(54) ONE-WAY CLUTCH OF SPRAG TYPE

(75) Inventors: Kazuhiko Muramatsu, Fukuroi (JP); Akira Iwano, Fukuroi (JP)

(73) Assignee: NSK Warner K.K., Tokyo (JP)

( * ) Notice: Subject to any disclaimer, the term of this patent is extended or adjusted under 35 U.S.C. 154(b) by 310 days.

(21) Appl. No.: 11/401,275

(22) Filed: Apr. 11, 2006

(65) Prior Publication Data

US 2006/0231365 A1 Oct. 19, 2006

(30) Foreign Application Priority Data

Apr. 14, 2005 (JP) .............................. 2005-116919

(51) Int. Cl.
*F16D 41/07* (2006.01)

(52) U.S. Cl. .................... 192/45.1; 192/41 A; 192/30 V

(58) Field of Classification Search ................ 192/45.1, 192/41 A, 104 C, 30 V; 188/82.8
See application file for complete search history.

(56) References Cited

U.S. PATENT DOCUMENTS

| | | | | |
|---|---|---|---|---|
| 3,165,183 A * | 1/1965 | Clements | ................. | 192/103 R |
| 3,651,908 A * | 3/1972 | Oldfield | ..................... | 192/45.1 |
| 3,997,041 A * | 12/1976 | Judd et al. | ................. | 192/41 A |
| 4,635,771 A * | 1/1987 | Shoji et al. | ................. | 192/41 A |
| 4,771,873 A * | 9/1988 | Kinoshita et al. | ......... | 192/41 A |
| 5,064,037 A * | 11/1991 | Long, Jr. | .................... | 192/41 A |
| 5,664,653 A * | 9/1997 | Kurita et al. | ............... | 192/45.1 |
| 5,676,226 A * | 10/1997 | Lampela et al. | ............ | 192/45.1 |
| 5,732,807 A * | 3/1998 | Itoh et al. | ...................... | 192/38 |
| 6,044,947 A * | 4/2000 | Kinoshita | .................. | 192/45.1 |
| 6,401,893 B1 * | 6/2002 | Kinoshita | .................. | 192/45.1 |

FOREIGN PATENT DOCUMENTS

JP 63-285336 A 11/1988
JP 2000-220663 A 8/2000

* cited by examiner

*Primary Examiner*—Rodney H Bonck
*Assistant Examiner*—John V Ligerakis
(74) *Attorney, Agent, or Firm*—Miles & Stockbridge P.C.

(57) ABSTRACT

The present invention provides a sprag type one-way clutch of disengaging type comprising an outer race having a substantially annular inner peripheral track surface, an inner race spaced apart from the outer race in a radial direction and disposed coaxially with and rotatable relative to the outer race and having a substantially annular outer peripheral track surface, a plurality of sprags disposed between the outer race and the inner race to transmit torque between the inner and outer track surfaces, and a ribbon spring for applying rising moment to the sprags, and wherein an outer diameter side cam surface of the sprag is provided with a mechanism for preventing fluctuation of the sprag during a predetermined number of idle revolutions of the outer race.

4 Claims, 2 Drawing Sheets

PRIOR ART

ONE-WAY CLUTCH OF SPRAG TYPE

BACKGROUND OF THE INVENTION

1. Field of the Invention

The present invention relates to a one-way clutch. More specifically, the present invention relates to an improvement in a sprag type one-way clutch of disengaging type.

2. Related Background Art

In general, one-way clutches in which an outer race is rotated are divided into a one-way clutch of engaging type attaching importance to an engaging ability and a one-way clutch of disengaging type attaching importance to low drag ability. Among them, the one-way clutch of disengaging type is designed so that, during engagement, when an inner race and an outer race are stopped or are rotated at a low speed, they are engaged by each other in an inner race driving fashion to transmit a power to the outer race, and, if over-run is generated at the outer race side, idle rotation occurs.

FIG. 4 shows a conventional one-way clutch of disengaging type, wherein, in a condition that a gravity center G of a sprag 23 is positioned at the left of a contact point A between the sprag 23 and an outer race 21, when a centrifugal force is generated, the sprag 23 is inclined toward a clockwise direction around the point A. Thus, a height of the sprag 23 is decreased, with the result that an inner race side cam surface of the sprag 23 is separated from a track surface of an inner race 22.

Further, a ribbon spring 27 serves to apply torque turning in an anti-clockwise direction to the sprag 23. When the outer race 21 is idly rotated in a direction shown by the arrow X at a high speed, the sprag 23 is more inclined toward the clockwise direction, and an inclined posture of the sprag 23 is maintained at a position where a rotational force obtained by the ribbon spring 27 is balanced with a rotational force obtained by the centrifugal force of the sprag 23. A one-way clutch of such type is disclosed in Japanese Patent Application Laid-open Nos. 2000-220663 and S63-285336 (1988).

However, in the conventional one-way clutch of disengaging type, due to vibration and/or rotational fluctuation during the high speed operation, the sprag is swung or fluctuated to apply repeated load to the ribbon spring, thereby causing fatigue damage of the ribbon spring and wear of a tip end of the ribbon spring which is contacted with the sprag.

In particular, when the one-way clutch is used as a starter of a motor bike, due to the vibration and/or rotational fluctuation during high speed idle rotation, the sprag is swung or fluctuated, with the result that a danger of damaging the ribbon spring of the one-way clutch may be increased.

SUMMARY OF THE INVENTION

Accordingly, an object of the present invention is to provide a one-way clutch of sprag type in which, even if an outer race is idly rotated at a high speed, fluctuation of a sprag can be suppressed, with the result that fatigue damage of a ribbon spring and wear of a tip end of the ribbon spring can be prevented.

To achieve the above object, the present invention provides a sprag type one-way clutch of disengaging type comprising an outer race having a substantially annular inner peripheral track surface, an inner race spaced apart from the outer race in a radial direction and disposed coaxially with and rotatable relative to the outer race and having a substantially annular outer peripheral track surface, a plurality of sprags disposed between the outer race and the inner race to transmit torque between the inner and outer track surfaces, and a ribbon spring for applying rising moment to the sprags, and wherein an outer diameter side cam surface of the sprag is provided with a mechanism for preventing fluctuation of the sprag during a predetermined number of idle revolutions of the outer race.

The present invention provides the following advantage.

Since the outer diameter side cam surface of the sprag is provided with the mechanism for preventing the fluctuation of the sprag during the predetermined number of idle revolutions of the outer race, problems caused by the fluctuation of the sprag can be eliminated. For example, the present invention can avoid the fact that, due to vibration and/or rotational fluctuation during the high speed operation, the sprag is swung or fluctuated to apply repeated load to the ribbon spring, thereby causing fatigue damage of the ribbon spring and wear of a tip end of the ribbon spring which is contacted with the sprag.

DESCRIPTION OF THE PREFERRED EMBODIMENTS

Figure 1:
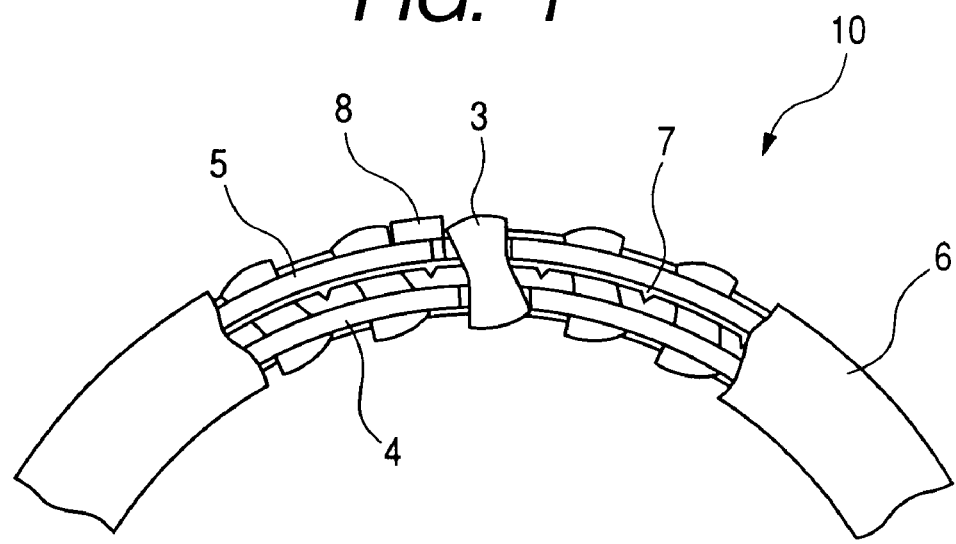
FIG. 1 is a partial front view showing, in partial fragmentation, a sprag type one-way clutch of disengaging type according to the present invention.

Now, embodiments of the present invention will be explained with reference to the accompanying drawings. FIG. 1 is a partial front view showing, in partial fragmentation, a sprag type one-way clutch of disengaging type according to the present invention. A sprag type one-way clutch of disengaging type 10 comprises an outer race 1 having a substantially annular inner peripheral track surface 1a, and an inner race 2 spaced apart from the outer race 1 in a radial direction and disposed coaxially with and rotatable relative to the outer race 1 and having a substantially annular outer peripheral track surface 2a. In FIG. 1, the outer race 1 and the inner race 2 are omitted from illustration.

The one-way clutch 10 of sprag type further comprises a plurality of gourd-shaped sprags 3 disposed between the outer race 1 and the inner race 2 and adapted to transmit torque between the inner peripheral track surface 1a and the outer peripheral track surface 2a, and a ribbon spring 7 for applying rising torque or rotational torque to the sprags 3. The sprags 3 are arranged equidistantly along a circumferential direction.

An inner holder 4 and an outer holder 5 each having a plurality of windows for holding the sprags 3 are arranged between the outer race 1 and the inner race 2. The plural windows and the sprags held therein are disposed equidistantly along the circumferential direction.

At both axial ends of the one-way clutch of sprag type, end bearings 6 are provided to maintain the outer race 1 and the inner race 2 in a concentric condition. In the one-way clutch 10, if a speed of a rotation of the outer race 1 is increased or decreased quickly, due to inertia, each of the sprags 3 is slid on the inner peripheral track surface 1a of the outer race 1, thereby causing wear and incorrect engagement. To avoid this, a predetermined friction force is applied between the outer holder 5 and the outer race 1 and i-bar working 8 is executed on the outer holder 5 so that the one-way clutch 10 is always rotated together with the outer race 1.

The sprag type one-way clutch 10 of disengaging type is designed in such a manner that, if the sprag 3 is inclined toward an idle rotation side of an outer race side cam surface 3a of the sprag 3, the sprag 3 is contacted with the inner peripheral track surface 1a at two contact points, so that a direction of an action line of a centrifugal force from a gravity center G of the sprag 3 at the number of idle revolutions greater than a predetermined number of revolutions is positioned between the two contact points, thereby preventing fluctuation of the sprag.

Figure 2:
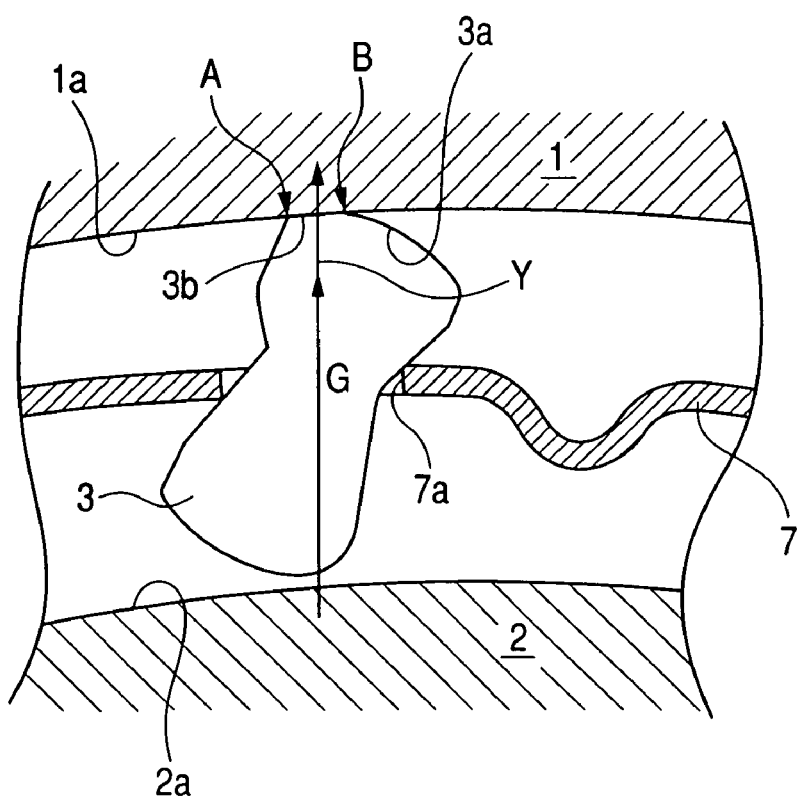
FIG. 2 is an axial partial sectional view of a one-way clutch of sprag type according to a first embodiment of the present invention.

Next, a first embodiment of the present invention will be explained with reference to FIG. 2. FIG. 2 is an axial partial sectional view of a one-way clutch of sprag type according to a first embodiment of the present invention. When the outer race is idly rotated at the predetermined number of revolutions, the outer cam surface 3a of the sprag 3 is contacted with the inner peripheral track surface 1a of the outer race 1 at two contact points A and B in a condition that the sprag 3 is inclined. In this case, the sprag 3 is separated from an outer peripheral track surface 2a of the inner race 2. Further, a constricted portion of the sprag 3 is fitted into an opening portion 7a of the ribbon spring 7. A peripheral surface of the sprag between the contact points A and B serves as a posture stabilizing area 3b for stabilizing the posture of the sprag 3. Although the posture stabilizing area 3a is a flat surface, it may be a curved surface so long as it has a curvature greater than that of the inner peripheral track surface 1a of the outer race 1.

So long as the direction of the action line Y of the centrifugal force from the gravity center G of the sprag 3 is positioned between the contact points A and B, the sprag 3 is stabilized against the fluctuation. That is to say, if the sprag is swung in a clockwise direction, due to the left contact point including the point A and the centrifugal force, anti-clockwise moment is generated, with the result that the sprag tries to be returned to the stabilized position. On the other hand, if the sprag 3 is swung in an anti-clockwise direction, due to the right contact point including the point B and the centrifugal force, clockwise moment is generated, with the result that the sprag tries to be returned to the stabilized position. In this way, the posture of the sprag 3 is stabilized.

Figure 3:
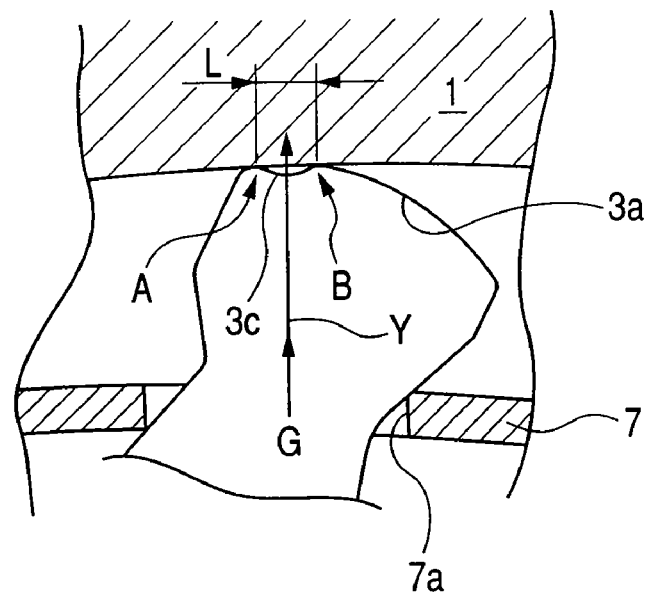
FIG. 3 is an axial partial sectional view of a one-way clutch of sprag type according to a second embodiment of the present invention.
Figure 4:
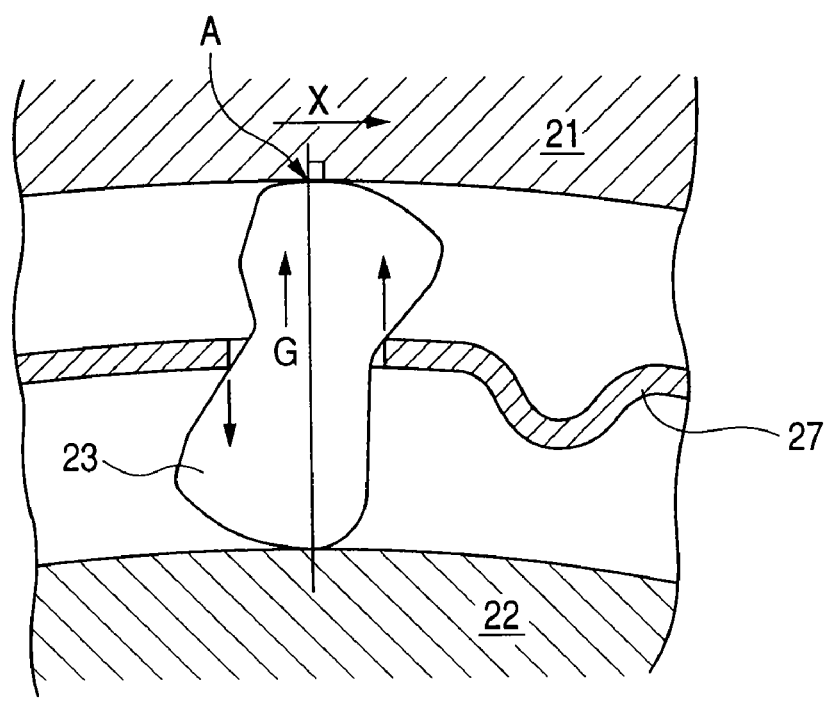
FIG. 4 is an axial partial sectional view of a conventional one-way clutch of disengaging type.

FIG. 3 is an axial partial sectional view of a one-way clutch of sprag type according to a second embodiment of the present invention. In FIG. 3, a posture stabilizing area 3c is formed as a recessed portion between the contact points A and B of the sprag contacted with the inner peripheral track surface 1a of the outer race 1. A distance or length L of the posture stabilizing area 3c is selected to ensure stabilization against the fluctuation.

Also in the second embodiment, so long as the direction of the action line Y of the centrifugal force from the gravity center G of the sprag 3 is positioned between the contact points A and B, the sprag 3 is stabilized against the fluctuation. The posture stabilizing area 3c may be formed as other shapes than those shown in FIGS. 2 and 3. For example, the contact points A and B of the outer cam surface 3a can be formed as projections. Incidentally, in FIGS. 2 and 3, holders are omitted from illustration.

In the above-mentioned embodiments, when designed in such a manner that the direction of the action line Y of the centrifugal force from the gravity center G of the sprag 3 is positioned at a substantially middle point between the contact points A and B, the sprag 3 is more stabilized against the fluctuation.

Further, in the above-mentioned embodiments, while an example that the posture stabilizing areas 3b and 3c are provided at one circumferential end portion of the outer cam surface 3a of the sprag 3 was explained, these areas are not necessarily provided at the one circumferential portion, but may be at a predetermined portion spaced apart from the circumferential end portion toward a central portion.

In the above-mentioned embodiments, it can be designed so that, at the posture stabilizing area 3b or 3c, the sprag 3 is face-contacted with the inner peripheral track surface 1a of the outer race 1 by a predetermined length area in the circumferential direction, and, when the outer race is idly rotated at the predetermined number of revolutions, the outer race 1 is face-contacted with the posture stabilizing area 3b or 3c and the direction of the action line Y of the centrifugal force from the gravity center G of the sprag 3 is positioned within the posture stabilizing area 3b or 3c.

Further, it can be designed so that, at the posture stabilizing area 3b or 3c, the sprag 3 is line-contacted with the outer race 1 at positions spaced apart from each other by a predetermined distance in the circumferential direction, and, when the outer race is idly rotated at the predetermined number of revolutions, the sprag is line-contacted with the outer race 1 at two contact points on both sides of the posture stabilizing area 3b or 3c and the direction of the action line Y of the centrifugal force from the gravity center G of the sprag 3 is positioned within the posture stabilizing area 3b or 3c.

The one-way clutch 10 of sprag type mentioned above can be applied to not only a one-way clutch of the type having outer and inner holders but also a one-way clutch of the type having a single holder.

This application claims priority from Japanese Patent Application No. 2005-116919 filed Apr. 14, 2005, which is hereby incorporated by reference herein.

What is claimed is:

1. A sprag type one-way clutch of disengaging type comprising:
  an outer race having a substantially annular inner peripheral track surface;
  an inner race spaced apart from said outer race in a radial direction, disposed coaxially with and rotatable relative to said outer race, and having a substantially annular outer peripheral track surface;
  a plurality of sprags disposed between said outer race and said inner race so as to be able to transmit torque between said inner and outer peripheral track surfaces; and
  a ribbon spring for applying rising moment to said sprags,
  wherein an outer diameter side cam surface of each sprag is provided with a mechanism for preventing fluctuation of the sprag during a predetermined rate of rotation of said outer race,
  said mechanism includes a posture stabilizing area provided at a predetermined position on an idle rotation side of said outer diameter side cam surface of the sprag, and, when said outer race is idly rotated at the predetermined rate of rotation, each sprag is line-contacted with said outer race at two predetermined points spaced apart from each other by a predetermined length in a circumferential direction in said posture stabilizing area and a direction of an action line of a centrifugal force from a gravity center of said sprag is positioned within said posture stabilizing area.

2. A sprag type one-way clutch according to claim 1, wherein the direction of the action line of the centrifugal force from the gravity center is directed toward a substantially middle portion of said posture stabilizing area.

3. A sprag type one-way clutch of a disengaging type comprising:

an outer race having a substantially annular inner surface;

an inner race having a substantially annular outer surface corresponding to and concentric with said inner surface;

a plurality of sprags disposed in an annular space formed between said inner and outer surfaces; and a spring disposed in the annular space so as to apply a biasing force to the plurality of sprags, wherein, when the outer race is rotated at a rate exceeding a threshold, a cam surface of each sprag contacts said inner surface only at a pair of lines spaced apart in a circumferential direction, and each sprag is arranged such that a radial line extending from each sprag's center of gravity intersects said inner surface at a point between the said pair of lines.

4. A sprag type one-way clutch according to claim 3, wherein each sprag is arranged such that the radial line extending from each sprag's center of mass intersects said inner surface at a point substantially halfway between said pair of lines.

* * * * *